J. T. KIRK.
COLTER.
APPLICATION FILED JAN. 4, 1919.

1,308,676.

Patented July 1, 1919.

Inventor
John T. Kirk
by Lacey & Lacey
Attys.

UNITED STATES PATENT OFFICE.

JOHN T. KIRK, OF MEMPHIS, TENNESSEE.

COLTER.

1,308,676.    Specification of Letters Patent.    Patented July 1, 1919.

Application filed January 4, 1919. Serial No. 269,652.

*To all whom it may concern:*

Be it known that I, JOHN T. KIRK, a citizen of the United States, residing at Memphis, in the county of Shelby and State of Tennessee, have invented certain new and useful Improvements in Colters, of which the following is a specification.

The object of this invention is to provide simple and efficient means whereby a colter may be secured in a plow beam and positively held against displacement but may be readily removed if repairs be necessary. To this end the invention consists in certain novel features which will be hereinafter first fully described and then particularly pointed out in the appended claim.

In the accompanying drawings—

Figure 1:
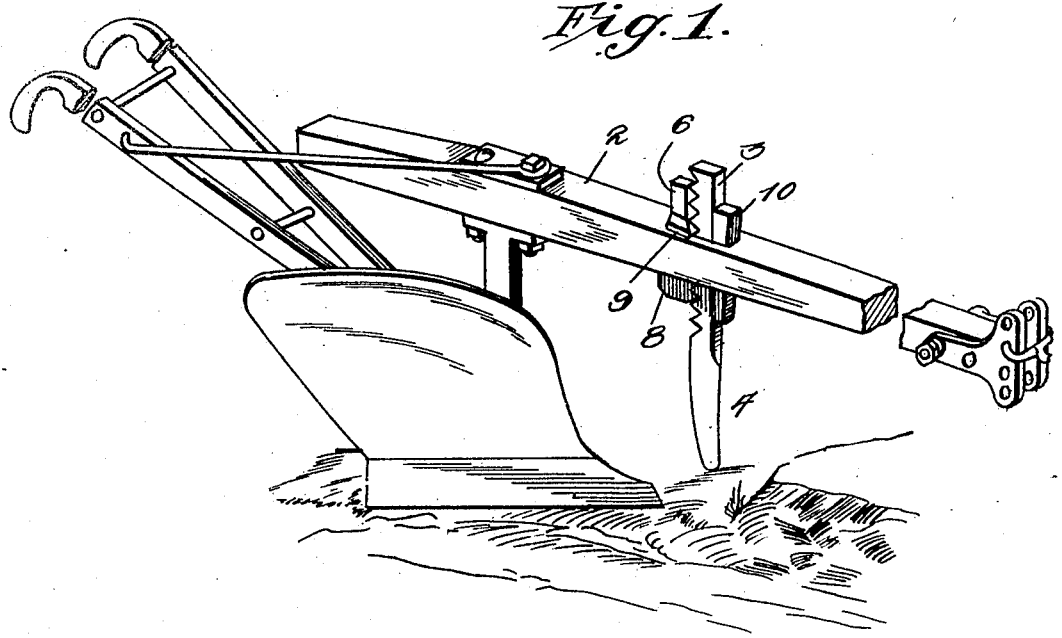
Figure 1 is a perspective view of a plow showing a colter secured in position in accordance with my invention.
Figure 2:
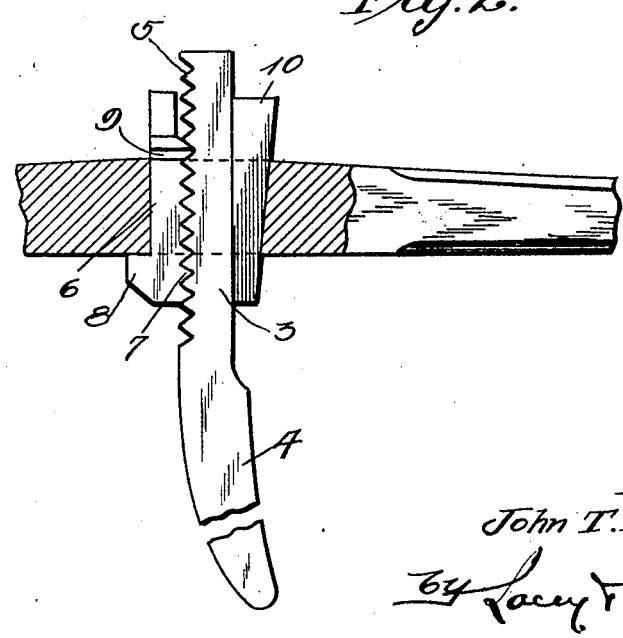
Fig. 2 is an enlarged elevation of the colter and the means for securing the same in position, the plow beam being shown broken away and in section.

The plow may be of any desired form and includes a beam 2 of the usual dimensions and construction. Through the beam, in advance of the plow, is formed a vertical opening through which the shank 3 of the colter 4 is inserted and the shank is provided on one edge, preferably the rear edge, with a plurality of teeth 5, as clearly shown. A locking bar 6 is also inserted through the opening in the plow beam and this locking bar is constructed on one edge with a plurality of teeth 7 adapted to interengage with the teeth 5 on the opposed edge of the colter shank whereby relative vertical movement of the locking bar and the colter will be prevented. The locking bar is preferably rectangular in cross section so that it will fit closely between the opposite side walls of the opening in the plow beam and at its lower end, on its rear side, is provided with a stop lug or shoulder 8 adapted to engage against the bottom of the plow beam, as shown clearly in Fig. 2. Near its upper end, the locking bar is provided on its sides with lateral lugs or stops 9 which are adapted to extend over the sides of the opening in the plow beam and rest upon the top of the plow beam so that vertical movemnt of the locking bar through the opening will be prevented when the parts are in normal position, the sides of the locking bar below the said lateral shoulders or stops being smooth and plane so that the bar may be readily inserted through the plow beam opening when assembling the colter and locking bar as will be readily understood. Between that edge of the colter shank remote from the teeth 5 and the adjacent end of the plow beam opening, I insert a wedge shaped key 10 which, when driven home, will bind between the end of the opening and the edge of the colter shank, as shown in Fig. 2, so that the parts will be effectually held together.

The manner of securing the colter in position in accordance with my invention will be readily understood. The opening through the plow beam is obviously longer than the combined width of the colter shank and the locking bar but the width of said opening is such that the sides of the shank and the locking bar will bear against the sides of the opening and twisting movement of the colter and the locking bar will be thereby prevented. To secure the colter in place the locking bar is inserted downwardly through the opening in the plow beam until the stop lugs or shoulders 9 bear upon the top of the beam after which the bar is moved longitudinally of the beam so that the stop lug 8 will engage the under surface of the beam at the end of the opening and preferably the locking bar will be arranged at the rear end of the opening although obviously it may be arranged at the front end. It is also to be noted that the length of the locking bar between the stop lugs or shoulders 8 and 9 is just about equal to the vertical dimensions of the plow beam so that when the bar is in place vertical movement thereof will be positively prevented. The locking bar being thus arranged in position, the colter is inserted upwardly through the opening and then moved longitudinally of the same so that the teeth 5 thereof will interengage with the teeth 7 on the locking bar and it is obvious that the colter may be set at any position of vertical adjustment within the range of the series of teeth. After the colter has been thus arranged in engagement with the locking bar, the key 10 is inserted between the colter and the forward end of the plow beam opening and is driven home until it fits tightly in the said opening thereby binding the colter in its engagement with the locking bar so that the colter will be firmly secured and will be held against movement in any direction.

My device is exceedingly simple in the construction and arrangement of its parts and may be applied to any plow at a very low cost. There are no bolts and nuts employed to fasten the colter and corrosion of parts cannot occur to such an extent that great force must be exerted to separate the parts when a colter is broken and is to be replaced with a new colter or other repairs are necessary. When it is necessary to remove or readjust the colter, a few light taps upon the lower smaller end of the key 10 will loosen the same so that it may be removed and the desired adjustment or replacement very quickly effected. The colter will be very firmly held in the position in which it may be set and the annoyance and trouble occasioned by the colter slipping out of place now so frequent is entirely overcome while the battering of the point of the colter or the top of the colter shank in the ordinary manner due to hammering thereon in an effort to dislodge the same when readjustment or repairs are necessary is entirely overcome in the use of my improved fastener.

Having thus described the invention, what is claimed as new is:

The combination with a plow beam having a vertical longitudinally extending opening therethrough, of a colter inserted through said opening and provided on one edge with a series of teeth, a locking bar inserted through said opening and provided on one edge with a series of teeth to engage with the teeth on the colter, the opposite edge of said bar being adapted to bear against the adjacent end of the opening in the plow beam, a longitudinally projecting stop on the lower end of the locking bar to engage against the bottom of the plow beam at the end of the opening therethrough, lateral stops on the sides of the locking bar to engage upon the top of the plow beam at the sides of the opening therethrough, and a wedge inserted through the opening in the plow beam and binding between the end of the same and the adjacent edge of the colter.

In testimony whereof I affix my signature.

JOHN T. KIRK. [L. S.]

Copies of this patent may be obtained for five cents each, by addressing the "Commissioner of Patents, Washington, D. C."